United States Patent

Jope et al.

[15] 3,640,666
[45] Feb. 8, 1972

[54] TRIM IN PLACE THERMOFORMING APPARATUS

[72] Inventors: Bruce T. Jope, South Glastonbury, Conn.; Alan R. Phillips, Monson, Mass.

[73] Assignee: Monsanto Company, St. Louis, Mo.

[22] Filed: Sept. 25, 1969

[21] Appl. No.: 860,888

[52] U.S. Cl. .............................. 425/302, 264/89, 264/153, 264/163, 425/306, 425/388
[51] Int. Cl. ................................ B29c 17/04, B29c 17/08
[58] Field of Search .............. 264/89, 90, 92, 93, 160, 163, 264/296, 322, 153; 18/19 BC, 19 BE, 19 BM, 19 F, 19 P, 35, DIG. 48

[56] References Cited

UNITED STATES PATENTS

| | | | |
|---|---|---|---|
| Re.26,413 | 6/1968 | Keyes | 264/163 X |
| 3,240,851 | 3/1966 | Scalora | 264/163 X |
| 3,271,816 | 9/1966 | Schneider | 18/19 F X |
| 3,342,914 | 9/1967 | Edwards | 264/92 X |
| 3,470,281 | 9/1969 | Knowles | 264/92 X |
| 3,518,334 | 6/1970 | Carrigan et al. | 264/160 X |

FOREIGN PATENTS OR APPLICATIONS

| | | | |
|---|---|---|---|
| 1,136,613 | 12/1968 | Great Britain | 264/89 |

*Primary Examiner*—Robert F. White
*Assistant Examiner*—J. H. Silbaugh
*Attorney*—James C. Logomasini, Michael J. Murphy and Neal E. Willis

[57] ABSTRACT

Apparatus for trim in place thermoforming of flanged containers from successive portions of a continuous sheet. The blade in the forming press for sealing each sheet portion during forming and for substantially severing each container from the sheet is integral with and on the same side of the sheet as the means for heating the sheet, and therefore is itself in a heated condition. This reduces the sharpness of and positions a troublesome edge at the lower surface of the container flange. Each mold may have a rounded nose portion for shaping a downturned flange as the container body is formed.

1 Claims, 6 Drawing Figures

PATENTED FEB 8 1972 3,640,666
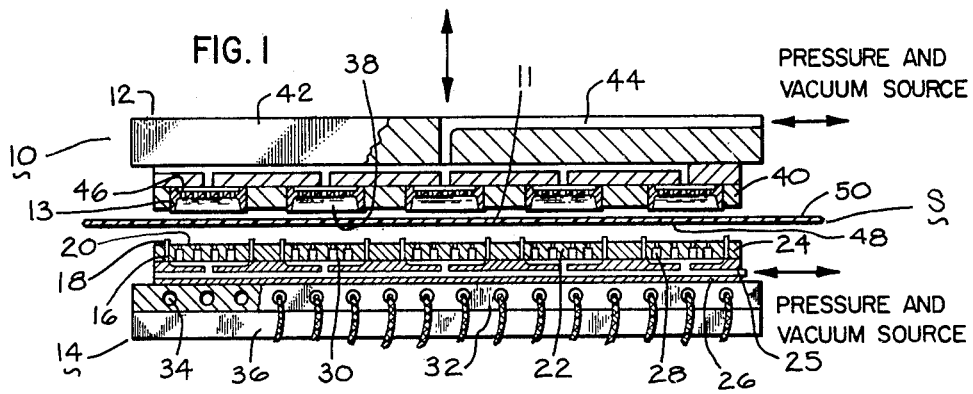
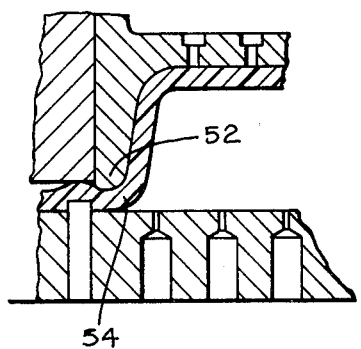
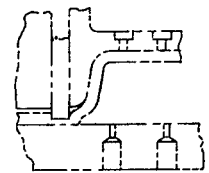
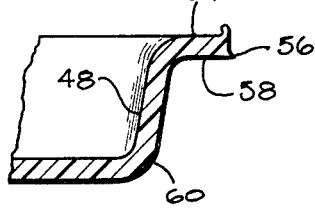
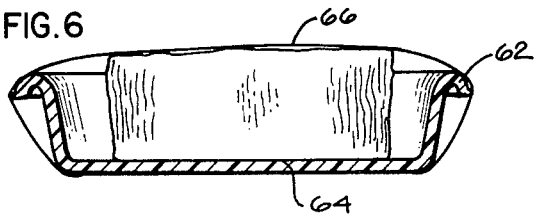
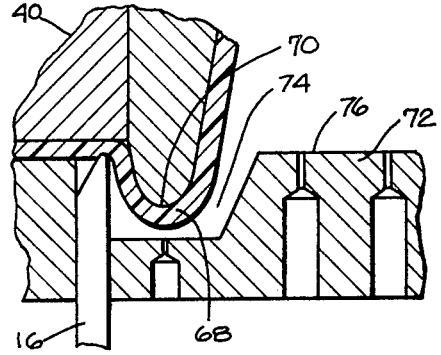
INVENTORS
BRUCE T. JOPE
ALAN R. PHILLIPS
BY *Michael J. Murphy*
ATTORNEY

TRIM IN PLACE THERMOFORMING APPARATUS

BACKGROUND OF THE INVENTION

This invention relates to apparatus for forming plastic articles from sheet material and more particularly to forming portions of a continuous thermoplastic sheet into articles by a pressure differential thermoforming technique.

In recent years there has been an ever increasing utilization of thermoformed containers of synthetic plastic for various packaging applications. Among the most widely used container forms are trays which may be overwrapped with a film of synthetic plastic to provide an attractive and hygienic container affording the opportunity to display the contents either partially or in their entirety if the tray is formed of transparent material.

As is well known, various techniques are employed for thermoforming and finishing such containers from the basic sheet stock. One technique is by pneumatic pressure differential forming of container depressions in a large area of the sheet, using peripheral sealing blades to hold the pressure in each mold during forming, followed by a peripheral creasing of the web by the blades around the formed articles at the seal while still in the press. This creasing is almost but not entirely through the web, in order that the articles may be transferred out of the forming station and thereafter easily peeled from the web along the creases by merely directing the web in a direction different from that of the containers. U.S. Pat. No. Re26,413 illustrates a machine operating on these principles. This type of forming is commonly referred to as a type of trim in place thermoforming, as opposed to post trim thermoforming wherein a separate trimming press is required downstream of the forming operation to separate the containers from the sheet, or the trim in place technique wherein the articles are entirely severed while in the forming press and then must be individually removed therefrom. From the standpoint of speed and economy, trim in place thermoforming of the first mentioned variety is highly desirable, since the portion of the sheet or web between the container cavities is used to transport the containers out of the forming press while effectively yet just barely attached to the web, thus facilitating subsequent removal by simple peeling.

Since these blades tend to wear and by design do not cut cleanly through the material, there is a tendency to crush and fracture the plastic thereby producing jagged edges and other particles of the synthetic plastic. These edges and particles substantially correspond to the areas of the sheet through which the blade penetrates, and appear on the container along the outer portion of a peripheral flange usually provided for strengthening purposes. This jagged edge represents a potential problem in that it may subsequently cut through a film overwrap to prematurely expose the contents, and also may be rather unpleasant to human touch. An exposed edge in turn may puncture the film overwrap of an adjacently stacked container. Moreover, particles of plastic adjacent the edge may contaminate the contents of the container or provide a gritty feel to a customer.

Apparatus of the type set forth in U.S. Pat. No. Re26,413, has the sealing and creasing blade positioned around unheated mold cavities on the opposite side of the sheet from the heating means. During the successive sealing and creasing strokes each blade moves toward the heating platen in the opposite direction from that of the sheet portion being drawn or forced into a mold cavity. Because of these opposing movements, surface contact between the plastic sheet and the outermost portion of the flange forming surface of the mold is often incomplete, as illustrated in FIG. 3 of the present drawings. This results in a flange on the container which is slightly upturned at its outer end, with the jagged surface produced by the fracturing of the plastic by the sealing and creasing blade being on the uppermost surface of the flange since the blade moves through the sheet toward the side which forms this uppermost surface. When such a container is later overwrapped with a thin, taut film, the sharp upturned edge is in direct contact with the film. Needless to say, this frequently causes film rupture during the packaging operation, with the chances of rupture being even greater when the container is a rectangular tray which is picked up, for example, by a purchaser in the area of one of its corners. When this is done, the film portion around the corner directly opposite the one held in the hand is put under rather severe tension while in contact with the upturned edge, which frequently causes the premature rupture.

Various approaches for eliminating this undesirable edge involve blunting or rounding it to thereby reduce its tendency to tear the overwrap. For example, solvent treating, burnishing, flame treating, etc., have all been proposed. Though each is satisfactory, these approaches involve treating already present edges in a separate auxiliary step downstream of the forming operation, with the attendant increases in equipment complexity, manpower requirements, etc. Another approach is that of post trimming from the sheet by means of individually heated knives. In addition to substantially increasing cycle time because of the necessity to align and sever in a separate set of trimming dies, another shortcoming of this approach is the difficulty of incorporating it into an existing system of the type set forth in U.S. Pat. No. Re26,413, wherein the web is merely passed around a roll located immediately adjacent the forming press to release finished containers from the web.

Now there has been discovered a new way to trim in place thermoform flanged containers from sheet material without producing a sharp outer edge on the flange.

Accordingly, it is a principal object of this invention to provide an improved apparatus for repeatedly forming flanged containers from a generally continuous sheet of thermoplastic.

Another object of this invention is to provide an improved trim in place, differential pressure forming apparatus for repeatedly forming flanged containers from a generally continuous thermoplastic sheet, without leaving a sharp film fracturing outer edge on the flange.

A further object of this invention is to provide a trim in place differential pressure-forming apparatus for repeatedly forming containers having turned down flanges from a generally continuous thermoplastic sheet.

Another object of this invention is to provide apparatus for differential pressure thermoforming containers having downturned flanges with a substantially smooth outer edge thereon.

A further object of this invention is to utilize the heat inherently present for softening the sheet in a trim in place differential pressure forming press to neutralize the fracturing effect of the sealing blade on the thermoplastic.

An additional object of this invention is to arrange the sealing and creasing blade in a trim in place, differential forming press so as to locate any edge produced as a result of its action on the thermoplastic during forming of a container on the lower side of the container flange, to thus minimize the tendency for such an edge to fracture a film overwrap placed about the container.

Other objects of this invention will in part be obvious and will in part appear hereinafter.

SUMMARY OF THE INVENTION

These and other objects are accomplished in a trim in place thermoforming apparatus for repeatedly forming plastic containers having laterally extending peripheral flanges from successive heated portions of a flexible plastic sheet by heating the blade used to provide the sealing and creasing of each sheet portion prior to its contact with each sheet portion and forcing the heated blade into each sheet portion through the side which is to form the inner surface of the container, whereby the edge on the flange extends outwardly from its bottom surface, thereby minimizing the tendency to tear a cover applied later over the flange of each container. Heating of the blade is accomplished by mounting it integral with the surface(s) used to heat the sheet by direct contact on the side of the sheet opposite to that of the mold. A downturned flange which is less prone to fracture an overwrap may be formed by forcing the sections of each sheet portion within the seals into contact with a rounded surface on the mold. The apparatus includes a series of blades mounted opposite the periphery of each mold, the blades having outer portions extending slightly beyond and substantially perpendicular to the outermost surface of heated plate means.

BRIEF DESCRIPTION OF THE DRAWINGS

In describing the overall invention, reference will be made to preferred embodiments illustrated in the accompanying drawings in which:

FIG. 1 is a schematic, sectional, elevational view of the apparatus of the invention prior to the start of a cycle;

FIG. 2 is an enlarged, schematic view of a portion of the apparatus of FIG. 1 illustrating sheet sealing;

FIG. 3 is a view similar to FIG. 2 illustrating the prior art approach for forming a flanged container;

FIG. 4 is a partial, sectional, elevational view of the improved flange formed by the present invention;

FIG. 5 is a view similar to FIG. 2 showing an alternative form of the apparatus of the invention; and FIG. 6 is a schematic view of an overwrapped package employing a container flange formed by the apparatus of FIG. 5.

DESCRIPTION OF THE PREFERRED EMBODIMENTS

With reference to the drawings wherein identical numerals refer to identical parts, there is shown in FIG. 1, major apparatus components for repeatedly forming plastic containers, such as trays, having laterally extending peripheral flanges from successive portions of a generally continuous flexible plastic sheet. This apparatus includes a forming press generally indicated as 10, having mold means 12 for forming heated, softened thermoplastic sheet portions into such containers. Mold means 12 is herein meant to include the apparatus components located above thermoplastic sheet portion 11 within forming press 10 in FIG. 1. Heated plate means 14 are provided within press 10 for heating each successive sheet portion prior to forming. Plate means 14 is herein meant to include the apparatus components located in FIG. 1 on the lower side of sheet portion 11. Means are provided (not shown) for reciprocating one of either mold means 12 or heated plate means 14 toward the other during the forming cycle. Sheet advancing means (not shown) are also provided for advancing each sheet portion 11 through press 10. Such reciprocating means and sheet advancing means may take the form shown in U.S. Pat. No. Re 26,413.

Means are provided in press 10 for sealing plural areas of each portion 11 of sheet S prior to forming and for creasing or reducing the thickness of each sheet portion around the periphery of each container after forming without completely severing the container from the remainder of sheet S. These means comprise a series of blades 16 mounted in heated plate means 14 opposite the periphery of each mold portion 13 of mold means 12. Blades 16 have outer portions 18 with blunted ends which extend slightly beyond and substantially perpendicular to upper or leading surface 20 of heated plate means 14. The extent to which portions 18 protrude from surface 20 may vary but is on the order of 0.020 inch.

Heated plate means 14 further comprises a series of adjacent forms 22, each of which generally conforms in peripheral contour to that of a container being formed. Each form 22 is positioned opposite a mold 13 with a plurality of such pairs positioned across the length and width of forming press 10, the illustration in FIG. 1 depicting only a single row of such components. Spacer plates 24 are positioned intermediate blades 16 in abutting relationship therewith, blades 16, in turn abutting forms 22. Forms 22 and spacer plates 24 are mounted by suitable conventional means on baffle plate 26 of heated plate means 14. Baffle plate 26 has suitable channels 25 formed therein connected by conventional valve means not shown to pneumatic pressure and vacuum supply sources. These channels communicate with surface 20 of heated plate means 14 through a series of small holes 28 bored in each form 22 extending from its outer surface 20 to its lower surface 30. Baffle plate 26 is in turn mounted on heating platen 32 having conventional cartridge-type resistance heaters 34 embedded therein for increasing the temperature of platen 32 as well as that of baffle plate 26 and each of forms 22 which are in heat-conductive contact with heating platen 32. Platen 32 may in turn be mounted on a suitable support plate 36.

Situated on the other side of sheet portion 11, mold means 12 comprises a series of molds 13, each of which has a cavity 38 aligned opposite a form 22 with cavity 38 generally conforming in surface contour to that of a shallow tray. Mold means 12 further comprises a series of anvil portions 40 surrounding each mold and aligned opposite one or more blades 16. Anvil portions 40 serve to support the periphery of each sheet section of portion 11 being formed into a container during its penetration by a blade 16. As further conventional portions of mold means 12, there is provided support frame 42 having channels typically indicated as 44 formed therein connected by conventional valve means, now shown, to suitable sources of pneumatic pressure and vacuum, in a manner similar to that associated with plate means 14. Each mold 13 has a series of small holes 46 connecting its inner and outer surfaces, by means of which pressure or vacuum is applied to the molding surfaces through channel 44.

In operation, a portion of a generally continuous thermoplastic sheet S, such as that identified as 11 within the limits of forming press 10 in FIG. 1, is caused to advance from a suitable source into forming press 10 between mold means 12 and heated plate means 14, by means of a conventional sheet-advancing mechanism. When such a portion S of the sheet is positioned within press 10, a partial vacuum is applied through holes 28 in forms 22 while a pressure in excess of atmospheric is applied through holes 46 in molds 13, to force side 48 of sheet portion 11 into intimate contact with surface 20 of each form 22. Surfaces 20 are at elevated temperature, e.g., generally between about 175° to 350° F., being dependent on the type of thermoplastic being formed, as a result of their conductive association with heaters 34. After each section of sheet portion 11 which is to form a container reaches a sufficient temperature such that it may be readily pneumatically drawn, or preferably at the start of the imposition of reduced pressure on the side 48 of the portion 11 of sheet S being heated so as to hold sheet portion 11 in place during heating, mold means 12 is caused to reciprocate downwardly by conventional actuating means, not shown. This causes anvil portions 40 of mold means to press against side 50 of sheet S and thereby force side 48 of sheet S into the outer protruding portions 18 of blades 16 to the extent of approximately one-half of the thickness of sheet S. This seals each section of the sheet portion between an anvil portion and a blade. Simultaneously or immediately thereafter, the pressure and vacuum being applied to either side of sheet portion 11 are reversed, such that reduced pressure is exerted through holes 46 in molds 13 and pressure in excess of atmospheric is applied through holes 28 in forms 22 to forcibly snap the section of each sheet portion confined within a blade 16 into surface contact with its oppositely aligned mold 13, as generally depicted in FIG. 2. In so doing, portion 52 of each mold 13 forms a peripherally extending flange 54 on each container. After each container is thus formed, relative motion is again caused to occur between mold means 12 and heated plate means 14 such as, for example, by means of the actuating means for lowering mold means 12. This causes the leading portion 18 of each blade 16 to advance further into sheet S, terminating at about 90 to 95 percent of the total sheet thickness, thereby substantially but not completely severing each formed container from sheet portion S.

After this occurs, the pressure acting on the surfaces of mold 13 is increased to above atmospheric so as to force the formed containers from the molds, whereupon one of either mold means 12 or heated plate means 14 is moved away from the other and sheet portion S with the plurality of flanged containers still attached therein is advanced out of press 10 by the sheet advancing means, thereby causing a subsequent portion of the generally continuous sheet to move into place within the forming press for the start of the next cycle. The formed containers are then peeled out of sheet portion 11 as generally indicated in U.S. Pat. No. Re26,413, by causing the web of sheet portion S between the containers to move in one direction while preventing the containers from moving in that direction, as by winding the web about a roller.

As can be appreciated from FIG. 1, by mounting the blades used to seal and subsequently crease or substantially sever each sheet portion in intimate contact with the heated plate means which is made of a heat conductive material, these blades are at essentially the same temperature as that of surfaces 20 used to render each sheet portion malleable, and which is elevated in comparison with that of molds 13. As depicted in FIG. 4, projection 56 which would otherwise appear as a jagged edge extending outwardly in the same direction as flange 54 and which is caused by the crushing and rupturing of the plastic during penetration by blades 16, is now blunted and yieldable to pressure applied in the vertical direction such that its tendency to fracture an overwrap later applied around the tray is substantially reduced or eliminated. Also, the position of the projecting portion 56 is such as to reduce its exposure to the film since it is located on the lower surface 58 of flange 54 as a result of forcing blade portions 18 into sheet S through lower side 48 thereof which is to form the inner surface of the container, as opposed to forcing it through the upper surface 60 which forms the outer surface of the container, and as would occur if blades 18 were positioned on the mold means side of sheet S.

In FIG. 5 is shown an alternative embodiment of the invention for forming downturned flange 62 on container 64, thus minimizing the influence of any edge on an overwrap 66 (FIG. 6) applied about container 64 in contact with flange 62. This is accomplished by drawing peripheral portion 68 of each sheet section forming a container into contact with a rounded protruding nose portion 70 of each mold 13 during the container forming portion of the cycle. Each nose portion 70 extends outwardly from its immediately adjacent anvil section 40. Otherwise blade 16 is the same as that depicted in FIG. 1. Form 72 has a peripherally extending recess 74 formed therein into which nose portion 70 enters during drawing of the plastic in the forming cycle. Recess 74 in heating surface 76 also causes the peripheral area of each sheet section to be slightly stretched as it is applied against heating surface 76, to thereby improve its contact therewith as a result of the increase in the surface area of the peripheral portion due to the recess, over that of the sheet section. This depth of recess 74, however, is rather important, since if it is excessive, the portion of the sheet forming the downturned flange will not sufficiently contact the heated surface of the recess and therefore cannot be adequately deformed. On the other hand, if the depth is too shallow, the extent to which the flange is turned down is not sufficient to provide the desired hinge type of action when the tray is overwrapped. For most sheet thicknesses, this depth is usually between about 0.025 to 0.05 inch.

The above description and particularly the drawings are set forth for illustration purposes only and are not to be taken in a limited sense.

The blade utilized in the present invention must have a blunted leading edge for accomplishing sealing and creasing or substantial severing of each sheet portion, as opposed to being sharp, in order to avoid cutting entirely through the material. In any event, it must be at an elevated temperature which is substantially greater than that of the container molds, which themselves should be unheated in order to set the plastic of the formed containers as rapidly as possible.

Because of the intimate contact between the sealing and creasing blades with the heated surface used to soften the sheet for drawing, the blades will generally assume the same temperature as this heated surface, which for the majority of thermoplastics is between 175° to 350° F. with contact being maintained for about 2 to 4 seconds. Thus the action of the blades on the sheet in the present invention is best described as a combination of melting and of shearing the thermoplastic across a single plane. Thus if the knife configuration or contact conditions are biased in favor of either of these actions, the desired balance cannot be maintained. For example, if the blade is razor sharp the sheet will be cut through during the closing of the press and sealing during forming cannot be maintained. Also, if the blades are left too long in contact with the sheet or are at too great a temperature, a similar unsatisfactory result will be obtained.

The surface for heating each sheet portion during a forming cycle in the present invention basically comprises a series of adjacent perforated forms each of which has a peripheral configuration generally conforming to that of its oppositely aligned mold. Its leading or upper surface may be substantially planar when a horizontal flange is desired on the container, or it may alternatively be recessed slightly about its periphery to accommodate entry of the leading nose portion of the mold when it is desired to form a downturned flange on the container. Preferably the depth in an axial direction of such a recess is about 0.010 to 0.020 inch in excess of the extent to which the nose portion of a mold projects outwardly from the immediately adjacent anvil portion of the mold means, since it is desired to draw the sheet about the nose to form the flange rather than to compression mold it between the nose portion and the recessed surface.

The present invention may be effectively utilized to shape a turned down flange on a container or to neutralize the effect of a sharp edge on the flange of a container formed in a high speed, trim in place, differential pressure thermoforming operation. The invention is especially applicable in forming containers which will be later overwrapped with a delicate film covering.

It is obvious that many variations may be made from those set forth above without departing from the spirit and scope of the invention.

What is claimed is:

1. In apparatus for repeatedly forming plastic containers having laterally extending peripheral flanges from successive portions of a generally continuous flexible plastic sheet including a forming press having mold means for forming containers from said heated, softened thermoplastic sheet portions, heated plate means within said press for heating each successive sheet portion prior to forming, means for reciprocating one of said mold means and heated plate means toward the other, sheet-advancing means for advancing each sheet portion through the press and means in the press for sealing plural areas of each sheet portion prior to forming and for reducing the thickness of the sheet portions around the periphery of each container after forming without entirely severing the containers from the sheet portion, the improvement wherein said heated plate means includes a series of adjacent forms separated from each other by spacer plates, each of said forms generally conforming in peripheral contour to that of said containers, each mold of said mold means including a cavity aligned opposite one of said forms having a surface configuration of one of said containers, said improvement further including a series of blades mounted in said plate means each of which has a relatively blunt leading end extending slightly beyond the leading surfaces of said forms for sealing and reducing the cross section of each sheet portion during each cycle of the forming press, each of said blades surrounding one of said forms in heat transfer contact therewith and being aligned opposite the periphery of one of said molds.

* * * * *